US006858677B2

(12) United States Patent
Kazakov et al.

(10) Patent No.: US 6,858,677 B2
(45) Date of Patent: Feb. 22, 2005

(54) MULTIMODAL POLYOLEFIN PIPE

(75) Inventors: Alexei Kazakov, Calgary (CA);
Stephen John Brown, Calgary (CA);
Christopher John Brooke Dobbin,
Calgary (CA); Stanley Allan Grabow,
Calgary (CA)

(73) Assignee: Nova Chemicals (International) S.A.
(CH)

( * ) Notice: Subject to any disclaimer, the term of this patent is extended or adjusted under 35 U.S.C. 154(b) by 0 days.

(21) Appl. No.: 10/644,430

(22) Filed: Aug. 20, 2003

(65) Prior Publication Data
US 2004/0054088 A1 Mar. 18, 2004

Related U.S. Application Data

(62) Division of application No. 10/088,327, filed on Mar. 13, 2002, now Pat. No. 6,642,313.

(30) Foreign Application Priority Data

Oct. 7, 1999 (CA) ................................................. 001979
Oct. 7, 1999 (CA) ............................................. 2285723

(51) Int. Cl.$^7$ .......................... C08L 23/00; C08L 23/04; F16L 11/00
(52) U.S. Cl. ....................... 525/191; 525/240; 138/118; 138/120; 138/128
(58) Field of Search ................................ 525/191, 240; 138/118, 120, 128

(56) References Cited

U.S. PATENT DOCUMENTS

| | | |
|---|---|---|
| 5,132,380 A | 7/1992 | Stevens et al. |
| 5,198,401 A | 3/1993 | Turner et al. |
| 5,382,630 A | 1/1995 | Stehling et al. |
| 5,382,631 A | 1/1995 | Stehling et al. |
| 5,434,116 A | 7/1995 | Sone et al. |
| 5,554,775 A | 9/1996 | Krishnamurti et al. |
| 5,589,555 A | 12/1996 | Zboril et al. |
| 5,637,659 A | 6/1997 | Krishnamurti et al. |

Primary Examiner—Nathan M. Nutter
(74) Attorney, Agent, or Firm—Kenneth H. Johnson

(57) ABSTRACT

A solution polymerization process in a series or parallel of two or more reactors at different temperatures is used to prepare a multimodal polyolefin resin of narrow molecular weight distribution. This resin is used to manufacture melt extruded pipe that has an improved performance at elevated temperatures and an improved hydrostatic design.

14 Claims, 1 Drawing Sheet

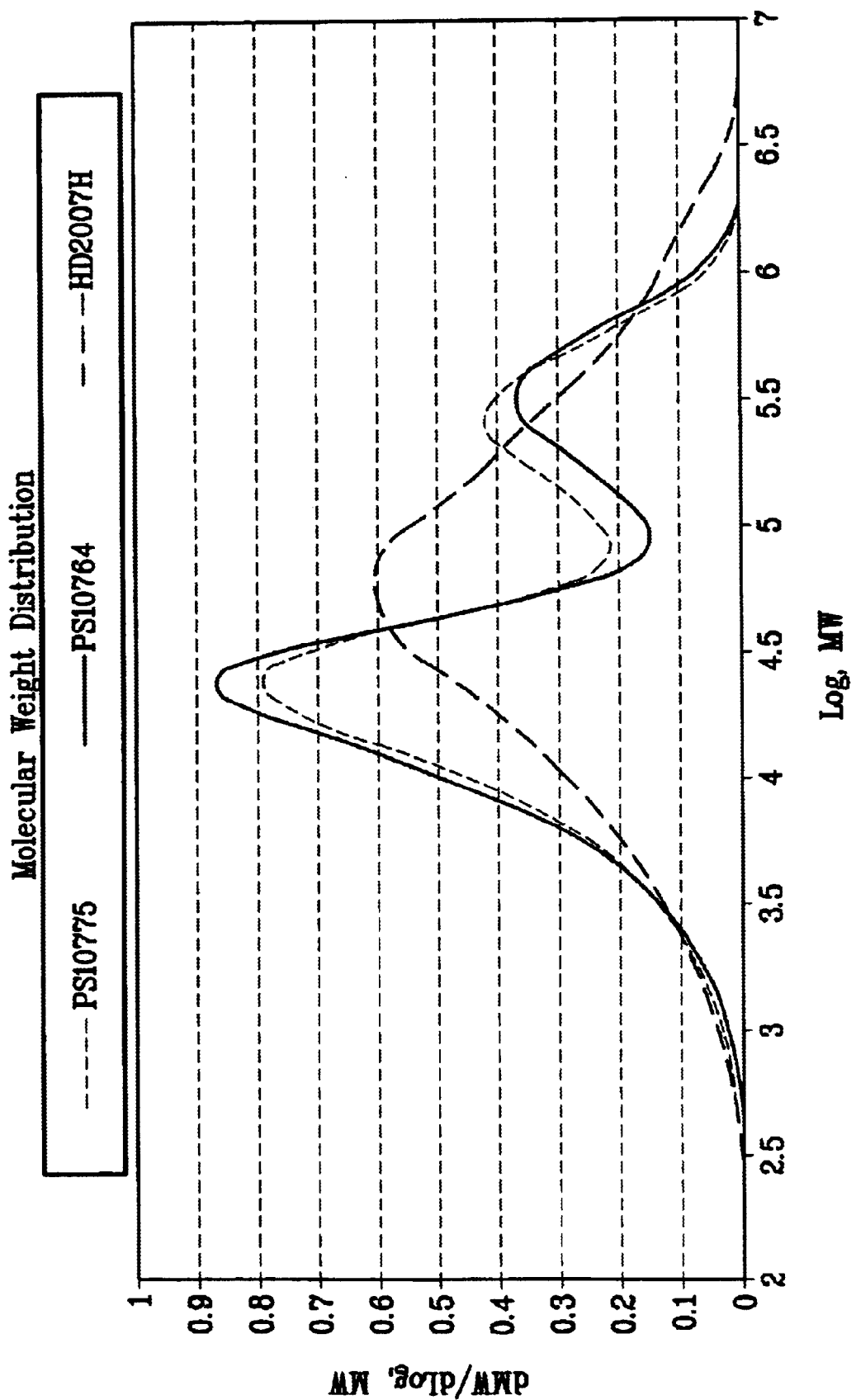

MULTIMODAL POLYOLEFIN PIPE

This application is a Divisional of application Ser. No. 10/088,327, filed Mar. 13, 2002, and now U.S. Pat. No. 6,642,313.

TECHNICAL FIELD

The present invention relates to polyolefin pipes made from a multimodal resin, a high density ethylene copolymer resin per se, and a process for preparing the resin.

BACKGROUND ART

There are a number of recent developments relating to polymers made using catalysts having a single or uniform active site such as a metallocene catalyst or constrained geometry catalyst. One class of polymers made using these types of catalysts systems is polyethylene, typically low density polyethylene. In some cases the polymers may contain long chain branching. The present invention relates to high density copolymers of ethylene.

Representative of the above art are Exxon's U.S. Pat. Nos. 5,382,630 and 5,832,631 both issued Jan. 17, 1995 to Stehling et al. The patents disclose blends of linear low density polyethylene. The blend per se has a polydispersity (Mw/Mn) greater than 3 while each component in the blend has a polydispersity of less than or equal to 3 and a different average molecular weight. The 631 patent is restricted to blends having a density from 0.88 to 0.900 g/cm$^3$, which is well below the density of the blends of the present invention. The 630 patent claims blends having a density greater than 0.900 g/cm$^3$, preferably from 0.900 to 0.940 g/cm$^3$, which is essentially free of components having a higher average molecular weight and lower average comonomer content than that of any other component in the resin. This later feature is essentially directed to "reverse comonomer incorporation". Typically with conventional catalysts at a higher molecular weight there is a reduced tendency for the incorporation of the comonomer. (Or put the other way, the comonomer incorporation tends to be higher in the low molecular weight component of the polymers.) Additionally, the references disclose polymerizations at relatively low temperatures, such as gas phase reactions at temperatures from 50° C. to 120° C. and slurry polymerizations at temperatures up to 110° C. The references do not disclose polymerizations at temperatures greater than 120° C.

Applicants have been unable to locate any art disclosing the use of multimodal resins in the manufacture of pipe.

The EXXON patents disclose producing the blends "in situ" by reaction with a metallocene catalyst. Interestingly the patents teach the polymer may be made using a gas phase, high pressure, slurry or solution polymerization. However, the reference fails to teach a dual reactor process in which the reactors are operated at different temperatures, nor does the reference suggest polymerization temperatures greater than 120° C.

DISCLOSURE OF INVENTION

The present invention provides a multimodal polyolefin resin comprising not less than 80 weight % of ethylene and up to 20 weight % of one or more $C_{3-10}$ alpha olefins. The said resin has a density greater than 0.940 g/cm$^3$; a melt index determined according to ASTM D 1238 under a load of 2.16 kg; a temperature of 190° C. greater than 0.01 g per 10 minutes; a polydispersity greater than 3.5; and a CDBI of greater than 50 comprising at least:

a) from 5 to 50 weight % of a high molecular weight component having a density greater than 0.940 g/cm$^3$; a weight average molecular weight greater than 250,000; a polydispersity from 1.5 to 3.5; and a short chain branch content from 0.0 to 4.4 short chains per 1000 carbon atoms in the polymer backbone; and b) from 50 to 95 weight % of a lower molecular weight component having a density from 0.930 to 0.960 g/cm$^3$; a weight average molecular weight greater than 25,000; a polydispersity from 2.0 to 3.5; and a short chain branch content from 0.5 to 6.1 short chains per 1000 carbon atoms in the polymer backbone.

The present invention further provides a polyolefin pipe having a hydrostatic design basis at 23° C. of equal or greater than 1250 psi and a ductile-brittle failure transition of at least 2000 hours when measured at 80° C. under a minimum hoop stress of 900 psi prepared from the above composite resin.

The present invention further provides a process for preparing the above composite resin using a solution polymerization process in a series or parallel of two or more reactors at different temperatures each of which is not greater than 250° C.

BRIEF DESCRIPTION OF DRAWINGS

FIG. 1 is GPC traces (molecular weight distribution) of samples of polymer in accordance with the present inventions and a HDPE sold commercially for pipe.

BEST MODE FOR CARRYING OUT THE INVENTION

As used in this specification the following words or phrases have the following meanings:

Composition distribution breadth index (CDBI) means the weight percent of copolymer molecules having a comonomer content within 50% of the median total molar comonomer content of that component of the composite resin. The CDBI may be calculated from data obtained, in accordance with the teaching of Wild et al. *J. Poly. Sci., Poly.Phys. Ed.*, Volume 20, page 441 (1982).

Polydispersity is the ratio of the weight average molecular weight to the number average molecular weight (i.e. Mw/Mn) to any component in the composite resin or the composite resin per se.

The term "cyclopentadienyl" refers to a 5-member carbon ring having delocalized bonding within the ring and typically being bound to the active catalyst site, generally a group 4 metal (M) through covalent $\eta^5$-bonds.

The term short chain branching means the branches having less than 8 carbon atoms. This is determined by Nuclear Magnetic Resonance (NMR) and typically is determined as the number of branches per 1000 carbon atoms in the polymer backbone.

The term "scavenger" as used in this specification is meant to include those compounds effective for removing polar impurities from the reaction solvent. Such impurities can be inadvertently introduced with any of the polymerization reaction components, particularly with solvent, monomer and catalyst feed; and have an adverse effect on catalyst activity and stability. It can result in a decrease or elimination of catalytic activity, particularly when an activator capable of ionizing the group 4 metal complex is also present.

Solution polymerization processes are fairly well known in the art. These processes are conducted in the presence of an inert hydrocarbon solvent typically a $C_{5-12}$ hydrocarbon which may be unsubstituted or substituted by a $C_{1-4}$ alkyl group such as pentane, hexane, heptane, octane, cyclohexane, methylcyclohexane and hydrogenated naphtha. An additional solvent is Isopar E ($C_{8-12}$ aliphatic solvent made by Exxon Chemical Co.).

The polymerization may be conducted at temperatures from about 80° C. to about 250° C. Depending on the product being made this temperature may be from about 120° C. to about 250° C. for the polyethylenes. The pressure of reaction may be as high as about 15,000 psig for the older high pressure processes but normally range from about 100 to 4,500 psig.

The solution polymerization process of this invention must use at least two polymerization reactors in a series or parallel. The first polymerization reactor typically operates at a lower temperature ("cold reactor"). The polymerization temperature in the first reactor may be from about 80° C. to about 210° C., preferably from about 120° C. to 210° C. The second reactor is typically the "hot" reactor, which may be operated at temperatures of up to 250° C., preferably not less than about 160° C., and most preferably from about 180° C. to 210° C. Generally, the "hot" reactor is at least more than 15° C., typically more than 30° C., preferably more than 35° C. hotter than the cold reactor.

Both reactors are preferably "stirred reactors" (i.e. the reactors are well mixed with a good agitation system). Preferred pressures are from about 500 psi to 8,000 psi. The most preferred reaction process is a "medium pressure process", meaning that the pressure in each reactor is preferably less than about 6,000 psi (about 42,000 kiloPascals or kPa), but most preferably from about 1,500 psi to 3,000 psi (about 14,000–22,000 kPa).

Suitable olefin monomers may be ethylene and $C_{3-20}$ alpha olefins. Preferred monomers include ethylene and $C_{3-10}$ alpha olefins which are unsubstituted or substituted by up to two $C_{1-6}$ alkyl radicals. Illustrative non-limiting examples of such alpha-olefins are one or more of propylene, 1-butene, 1-pentene, 1-hexene, 1-octene and 1-decene.

The polyethylene polymers which may be prepared in accordance with the present invention typically comprise not less than 60 weight %, preferably not less than 70 weight %, most preferably not less than 80 weight %, of ethylene and the balance one or more $C_{4-10}$ alpha olefins, preferably selected from the group consisting of 1-butene, 1-hexene and 1-octene.

The polymer resulting from the polymerization comprises a blend of several composite resins each of which have different properties. The composite resins may be analyzed using gel permeation chromatography (GPC) analysis. However, the polymer exiting the reactor is a composite resin, therefore the resulting GPC analysis is subjected to mathematical interpretation to separate the components of the component resin. Software is available to differentiate the GPC data (curve) into its various components.

The blends or composite resins of the present invention may be multimodal comprising two or more components. Generally the composite resins are bimodal and have two polymer composite resin peaks or distributions having distinctive characteristics ("bimodal resin"). As noted above the GPC data (curves) may be separated into two or more distributions, each having a distinct weight average molecular weight and polydispersity. Direct sampling of the polymers from each reactor or other separation techniques may be necessary to determine other characteristics of the individual components in the composite resin.

The composite resin per se or in bulk will have a density greater than 0.940 g/cm³, preferably from 0.940 to 0.960 g/cm³, most preferably from 0.945 to 0.955 g/cm³. Desirably, the composite resin may have a density from 0.945 to 0.950 g/cm³. The composite resin will have a melt index determined in accordance with ASTM D 1238 under a load of 2.16 kg and at a temperature of 190° C. of at least 0.10 g/10 minutes, typically 0.10 to 0.50 g/10 minutes, preferably from 0.10 to 0.45 g/10 minutes, most preferably from 0.10 to 0.40 g/10 minutes. The composite resin should have a polydispersity greater than 3.5, typically greater than 4.0, preferably greater than 4.5, most preferably greater than 5.0. The composite resin should have a CDBI of at least 50, preferably from 70 to 95. Generally, the composite resins will be bimodal comprising from 5 to 50 weight %, preferably from 15 to 40 weight %, most preferably from about 25 to 40 weight % of the high molecular weight component. The composite resin will correspondingly comprise from 95 to 50 weight %, preferably from 85 to 60 weight %, most preferably from 75 to 60 weight % of the lower molecular weight component.

The high or higher molecular weight component of the composite resin will have a density greater than 0.940 g/cm³, typically greater than 0.950 g/cm³. Preferably, the density is from 0.945 to 0.960 g/cm³, most preferably from 0.943 to 0.953 g/cm³. The higher molecular component of the composite resin should have a weight average molecular weight greater than 250,000, typically from 325,000 to 450,000. The high molecular component of the composite resin may have a polydispersity from 1.5 to 3.5, preferably from about 2.0 to 3.5. The higher molecular weight component in the composite resin may have a short chain branch content from 0.0 to 4.4, typically less than about 3.5 short chain branches per 1000 carbon atoms in the backbone of the polymer component of the composite resin.

The lower molecular weight component of the composite resin will typically have a density greater than 0.930 g/cm³, preferably from 0.945 to 0.960 g/cm³, most preferably from 0.935 to 0.955 g/cm³. Typically the higher and lower molecular weight components in the composite resin will have a difference in density of at least 0.005 g/cm³. The lower molecular weight component should have a weight average molecular weight greater than 25,000, typically from 30,000 to 100,000, preferably from about 30,000 to about 75,000, most preferably from about 30,000 to 50,000. The low molecular weight component of the composite resin may have a polydispersity from 2.0 to 4.0, preferably from about 2.0 to 3.5. The lower molecular weight component has a short chain branching component from 0.5 to about 6.5, typically from about 0.5 to 6.1, preferably from about 0.5 to 5.0 short chain branches per 1000 carbon atoms in the backbone of the polymer component of the composite resin.

Generally, the composite resin, if it is bimodal will comprise from about 5 to 50 weight %, typically from 15 to 40 weight %, preferably from 15 to 30 weight %, most preferably from 15 to 25 weight % of the high molecular weight component based on the total composition of the high molecular weight component. Correspondingly, the low molecular weight component of the composite resin will comprise from about 95 to 50 weight %, typically from 85 to 60 weight %, preferably from 85 to 70 weight %, most preferably from 75 to 60 weight % of the composite resin based on the total composition of the composite resin.

The catalyst used to prepare the polymers of the present invention are typically phosphinimine catalysts. That is, the catalyst has at least one phosphinime ligand defined by the formula:

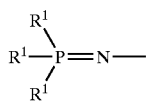

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical and a silyl radical of the formula:

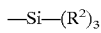

wherein each $R^2$ is independently selected from the group consisting of hydrogen, a $C_{1-8}$ alkyl or alkoxy radical, $C_{6-10}$ aryl or aryloxy radicals and a germanyl radical of the formula:

wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

Generally the phosphinimine catalysts are defined by the formula:

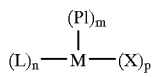

wherein M is a transition metal; Pl is a phosphinimine ligand (as described above); L is a monanionic ligand which is a cyclopentadienyl-type ligand or a bulky heteroatom ligand; X is an activatable ligand which is most preferably a simple monanionic ligand such as alkyl or a halide; m is 1 or 2; n is 0 or 1; and p is fixed by the valence of the metal M (i.e. p=the valence state of the metal—(m+n)).

In the above formula, M is a group 4 or 5 metal (where the numbers refer to columns in the Periodic Table of the Elements using IUPAC nomenclature). The preferred metals are from group 4, (especially titanium, hafnium or zirconium) with titanium being most preferred.

In the phosphinimine catalyst, L may be selected from the group of ligands consisting of cyclopentadienyl-type ligands and heteroligands.

The cyclopentadienyl-type ligands have a five-carbon ring which is bonded to the metal via eta-5 bonding ($\eta^5$- bonds). Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R^2)_3$; and germanyl radicals of the formula Ge—$(R^2)_3$ wherein $R^2$ is as defined directly above.

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands include ketimide ligands, silicon containing ligands, amido ligands, alkoxy ligands, phosphole ligands and boron hetrocyclic ligands.

As used herein, the term "ketimide ligand" refers to a ligand which:

(a) is bonded to the transition metal via a metal-nitrogen atom bond;

(b) has a single substituent on the nitrogen atom, (where this single substituent is a carbon atom which is doubly bonded to the N atom); and (c) has two substituents (Sub 1 and Sub 2, described below) which are bonded to the carbon atom.

Conditions a, b and c are illustrated below:

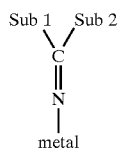

The substituents "Sub 1" and "Sub 2" may be the same or different. Exemplary substituents "Sub 1" and "Sub 2" include hydrocarbyl radicals having from 1 to 20 carbon atoms, silyl groups, amido groups and phosphido groups. For reasons of cost and convenience it is preferred that these substituents both be hydrocarbyls, especially simple alkyls and typically $C_{1-6}$, preferalby $C_{1-4}$ alkyl radicals. A particularly useful substituent is the tertiary butyl radical.

As used in this specification silicone-containing heteroligands means those ligands are defined by the formula:

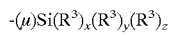

where the - denotes a bond to the transition metal and $\mu$ is sulfur or oxygen, preferably oxygen. Each $R^3$ is independently selected from the group consisting of $C_{1-10}$, typically $C_{1-4}$ alkyl radicals. Commercially, the most readily available silicon ligands are based on the methyl and ethyl substituted silicones. In the formula x, y and z may be from 0 to 3 provided the sum of x+y+z=3.

The term "amido" is meant to convey its broad, conventional meaning. Thus, these ligands are characterized by (a) a metal-nitrogen bond; and (b) the presence of two substituents on the nitrogen atom which are independently selected from the group consisting of $C_{1-8}$, preferably $C_{1-4}$ alkyl radicals or silyl radicals as defined above.

The term "alkoxy" is also intended to convey its conventional meaning. Thus, these ligands are characterized by (a) a metal oxygen bond; and (b) the presence of a linear, branched or cyclic hydrocarbyl radical bonded to the oxygen atom. Typically the hydrocarbyl radical may contain up to about 20 carbon atoms. Linear hydrocarbyl radicals may contain up to about 10 carbon atoms and be further substituted with one or more $C_{1-4}$ alkyl substituents. The hydrocarbyl radicals may be a $C_{6-10}$ cyclic radical which may be unsubstitued or further substituted with one or more $C_{1-4}$ alkyl radicals. A suitable alkoxy ligand is the 2,6 di-tertiary butyl phenoxy ligand.

The boron hetrocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659, 5,554,775 and the references cited therein).

As used herein the term phosphole ligand is also meant to convey its conventional meaning. "Phospholes" are cyclic dienyl structures having four carbon atoms and one phosphorus atom in the closed ring. The simplest phosphole is C₄Ph₄ (which is analogous to cyclopentadiene with one carbon in the ring being replaced by phosphorus). The phosphole ligands may be substituted with one or more, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116.

The term "activatable ligand" refers to a ligand which may be activated by a cocatalyst (also referred to as an "activator") to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, or a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; or a phosphido radical which is unsubstituted or substituted by up to two $C_{1-8}$ alkyl radicals.

The number of activatable ligands depends upon the valence of the metal and the valence of the activatable ligand. The preferred first catalyst metals are group 4 metals in their highest oxidation state (i.e. 4⁺) and the preferred activatable ligands are monoanionic (such as a halide—especially chloride or an alkyl ligand—especially a methyl ligand).

A suitable catalyst in accordance with the present invention contains a phosphinimine ligand, a cyclopentadienyl ligand and two chloride (or methyl) ligands bonded to the group 4 metal. In some instances, the metal of the first catalyst component may not be in the highest oxidation state. For example, a titanium (III) component would contain only one activatable ligand.

A preferred catalyst for use in accordance with the present invention is a group 4 organometallic complex in its highest oxidation state having a phosphinimine ligand, a cyclopentadienyl-type ligand and two activatable ligands. Generally a preferred catalyst has the following formula:

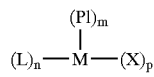

wherein: (a) M is a metal selected from Ti, Hf and Zr; (b) Pl is a phosphinimine ligand defined by the formula:

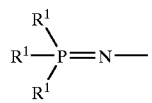

wherein each R¹ is independently selected from the group consisting of a hydrogen atom, a halogen atom, $C_{1-20}$ hydrocarbyl radicals which are unsubstituted or further substituted by a halogen atom, a $C_{1-8}$ alkoxy radical, a $C_{6-10}$ aryl or aryloxy radical, an amido radical, a silyl radical of the formula:

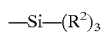

wherein each R² is independently selected from the group consisting of a hydrogen, a $C_{1-8}$ alkyl or alkoxy radical, $C_{6-10}$ aryl or aryloxy radicals, and a germanyl radical of the formula:

wherein R² is as defined above; (c) L is a ligand selected from the group consisting of cyclopentadienyl, substituted cyclopentadienyl, indenyl, substituted indenyl, fluorenyl or substituted fluorenyl; (d) X is an activatable ligand preferably selected from the group consisting of a halide atom and a $C_{1-4}$ alkyl ligand or radical, most preferably selected from the group consisting of a chloride atom, a methyl radical and an ethyl radical; and wherein m is 1, n is 1 and p is 2.

Generally the catalysts of the present invention are used in an amount to provide less than 1.5, preferably less than 1.0, most preferably less than 0.5 parts per million (ppm) of transition metal based on the total weight of the reactor contents. Typically the same or different catalysts are added to the cold and hot reactors independently. In some circumstances it may be possible to add a larger amount of catalyst to the cold reactor and have residual catalyst react in the subsequent hot reactor.

The catalyst components described above are used in combination with at least one cocatalyst (or "activator") to form an active catalyst system for olefin polymerization. Suitable activators include alumoxanes and ionic activators which are described in more detail below.

The activator may be selected from the group consisting of aluminum alkyl activators, aluminoxane activators and ionic activators. Typical aluminum activators have the formula $R_aAlX_b$, where R is a $C_{1-8}$, preferably $C_{1-4}$ alkyl or alkoxy radical and X is a halogen and a+b=3. Suitable aluminum alkyl activators include tri methyl aluminum (TMA), diethyl aluminum chloride (DEAC), ethyl aluminum dichloride, and the like.

The alumoxane activator may be of the formula:

wherein each R⁴ is independently selected from the group consisting of $C_{1-20}$ hydrocarbyl radicals and m is from 0 to 50, preferably R⁴ is a $C_{1-4}$ alkyl radical and m is from 5 to 30. Methylalumoxane (or "MAO") in which each R is a methyl is a preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

So-called "ionic activators" are also well known for metallocene catalysts as described in U.S. Pat. No. 5,198,401 (Hlatky and Turner) and U.S. Pat No. 5,132,380 (Stevens and Neithamer). Preferred ionic activators are boron-containing ionic activators as described below.

The boron activator may be selected from the group of boron compounds consisting of:
(i) compounds of the formula [R⁵]⁺ [B(R⁷)₄]⁻ wherein B is a boron atom, R⁵ is a aromatic hydrocarbyl (e.g. triphenyl methyl cation) and each R⁷ is independently selected from the group consisting of phenyl radicals which are unsubstituted or substituted with from 3 to 5 substituents selected from the group consisting of a fluorine atom; a $C_{1-4}$ alkyl or alkoxy radical which is unsubstituted or substituted by a fluorine atom; and a silyl radical of the formula —Si—(R$^9$)$_3$ wherein each R$^9$ is independently selected from the group consisting of a hydrogen atom and a C$_{1-4}$ alkyl radical; and (ii) compounds of the formula [(R$^8$)$_t$ZH]$^+$[B(R$^7$)$_4$]$^-$ wherein B is a boron atom, H is a hydrogen atom, Z is a nitrogen atom or phosphorus atom, t is 2 or 3, R$^8$ is selected from the group consisting of C$_{1-8}$ alkyl radicals; a phenyl radical which is unsubstituted or substituted by up to three C$_{1-4}$ alkyl radicals; or one R$^8$ taken together with the nitrogen atom may form an anilinium radical, and R$^7$ is as defined above; and (iii) compounds of the formula B(R$^7$)$_3$ wherein R$^7$ is as defined above.

In the above compounds, preferably R$^7$ is a pentafluorophenyl radical, R$^5$ is a triphenylmethyl cation, Z is a nitrogen atom and R$^8$ is a C$_{1-4}$ alkyl radical or R$^8$ taken together with the nitrogen atom forms an anilinium radical which is substituted by two C$_{1-4}$ alkyl radicals.

The "ionic activator" may abstract one or more activatable ligands so as to ionize the catalyst center into a cation but not to covalently bond with the catalyst; and to provide sufficient distance between the catalyst and the ionizing activator permitting a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available ionic activators include: N,N-dimethylaniliniumtetrakispentafluorophenyl borate, triphenylmethylium tetrakispentafluorophenyl borate, and trispentafluorophenyl borane.

If the activator is aluminum alkyl the ratio of Al:Transition metal is 5–200:1, preferably 10–40:1.

If the group 4 metal complex is activated with a combination of an alkylating agent (other than aluminoxane) and a compound capable of ionizing the group 4 metal complex, then the molar ratios of group 4 metal:metal in the alkylating agent; metalloid (i.e. boron or phosphorus) in the activator capable of ionizing the group 4 metal complex (e.g. boron) may range from 1:1:1 to 1:10:5. Preferably, the alkylating activator is premixed/reacted with the group 4 metal complex and the resulting alkylated species is then reacted with the activator capable of ionizing the group 4 metal complex.

In the solution polymerization process the monomers are dissolved/dispersed in the solvent either prior to being fed to the first reactor or for gaseous monomers, the monomer may be fed to the reactor so that it will dissolve in the reaction mixture. Prior to mixing the solvent and monomers are generally purified to remove potential catalyst poisons such as water, oxygen or metal impurities. The feedstock purification follows standard practices in the art (e.g. molecular sieves, alumina beds and oxygen removal catalysts are used for the purification of monomers). The solvent itself (e.g. methyl pentane, cyclohexane, hexane or toluene) is preferably treated in a similar manner. The feedstock may be heated or cooled prior to feeding to the first reactor. Additional monomers and solvent may be added to the second reactor and then it may be heated or cooled.

Generally, the catalyst components may be premixed in the solvent for the reaction or fed as separate streams to each reactor. In some instances premixing it may be desirable to provide a reaction time for the catalyst components prior to entering the reaction. Such an "in line mixing" technique is described in a number of patents in the name of DuPont Canada Inc. (e.g. U.S. Pat. No. 5,589,555 issued Dec. 31, 1996).

The residence time in each reactor will depend on the design and the capacity of the reactor. Generally, the reactors should be operated under conditions to achieve a thorough mixing of the reactants. In addition, it is preferred that from 20 to 60 weight % of the final polymer is polymerized in the first reactor, with the balance being polymerized in the second reactor. In a highly preferred embodiment, the first polymerization reactor has a smaller volume than the second polymerization reactor. On leaving the reactor system the solvent is removed and the resulting polymer is finished in a conventional manner.

Typically in the process of the present invention, the comonomer incorporation will be higher in the lower molecular weight component resins of the present invention than in the higher molecular weight component.

The resulting polymer is typically compounded either by the manufacturer or the converter (e.g. the company converting the resin pellets into the final pipe). The polyolefin may contain fillers, pigments and other additives. Typically the fillers are inert additives such as clay, talc, TiO$_2$ and calcium carbonate which may be added to the polyolefin in amounts of up to about 50 weight %, preferably less than 30 weight %. The polyolefin may contain typical amounts of antioxidants and heat and light stabilizers such as combinations of hindered phenols and one or more of phosphates, phosphites and phosphonites typically in amounts of less than 0.5 weight % based on the weight of the polyolefin. Pigments such as carbon black may also be added to the polyolefin in small amounts.

In the manufacture of pipe and other products, the polyolefin resin may contain a nucleating agent in amounts from about 1,500 to about 10,000 parts per million (ppm) based on the weight of the polyolefin. Preferably the nucleating agent is used in amounts from 2,000 to 8,000 ppm, most preferably from 2,000 to 5,000 ppm based on the weight of the polyolefin.

The nucleating agent may be selected from the group consisting of dibenzylidene sorbitol, di (p-methyl benzylidene) sorbitol, di (o-methyl benzylidene) sorbitol, di (p-ethylbenzylidene) sorbitol, bis (3,4-dimethyl benzylidene) sorbitol, bis (3,4-diethylbenzylidene) sorbitol and bis trimethylbenzylidene) sorbitol. One commercially available nucleating agent is bis (3,4-dimethyl benzylidene) sorbitol.

The polyethylene and the components for the pipe may be dry blended and then passed through an extruder, most preferably a high shear mixing extruder having an annular die and a mandrel to extrude the polyethylene into a pipe. Generally, the extruder will be operated at a temperature from about 200 to 280° C., preferably from about 230 to 250° C.

The present invention will now be illustrated by the following non-limiting examples.

EXAMPLES

Polymer Preparation

The examples illustrate the continuous solution copolymerization of ethylene and octane and medium pressure. The inventive examples used a first reactor which operated at a relatively low temperature (see Table 1). The first reactor pressure was about 17,000 kPa (about $2.5 \times 10^3$ psi), and the second reactor pressure was marginally lower (to facilitate flow from the first to second reactor). The contents from this reactor flowed into a larger, second polymerization reactor. (In a comparative experiment, only the second polymerization reactor was used.)

The first reactor had a volume of 12 liters and the second reactor had a volume of 24 liters. Both reactors were agitated to ensure good mixing of the reactor contents.

The process was continuous in all feed streams (i.e. solvent which was methyl pentane, monomers and catalyst systems) and in the removal of product monomer were purified prior to addition to the reactor using conventional feed preparation systems (such as contact with various absorption media to remove impurities such as water, oxygen and polar contaminants).

The reactor feeds were pumped to the reactors at the flow rates shown in Table 1. Ethylene and octane flows are described directly (kg/hr) and the total feed (kg/hr) further includes the solvent.

The catalyst used in all experiments was a titanium (IV) complex having one cyclopentadienyl ligand, two chloride ligands and one tri (tertiary butyl) phosphinimine ligand (referred to in Table 1 as "CpTiNP($^t$Bu)$_3$Cl$_2$"). The amount of catalyst feed to the reactor (expressed as moles of titanium) is shown in Table 1.

The cocatalysts were commercially available alumoxanes and a commercially available borate. More specifically, a PMAO-IP (purchased from Akzo-Nobel) and triphenylmethylium tetrakispentafluorophenyl borate (purchased from Asahi Glass, referred to as "Ph$_3$CB(C$_6$F$_5$)$_4$") was used in all experiments. The amount of aluminum and boron fed to each reactor is expressed as a mole ratio basis relative to the titanium contained in the catalyst.

Polymer properties were measured using test methods described below:

Melt index ("MI") measurements are conducted according to ASTM method D-1238.

Polymer densities are measured using ASTM D-1928.

Molecular weights were analyzed by gel permeation chromatography (GPC), using an instrument sold under the tradename "Waters 150 C", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw").

In each example the catalyst is CpTiNP($^t$Bu)$_3$Cl$_2$, the cocatalyst is PMAO-IP (Akzo-Nobel) and the activator is Ph$_3$C B(C$_6$F$_5$)$_4$ (Asahi Glass). The catalyst and activator were mixed just before entering the reactor at ambient temperature (e.g. about 20–25° C. and then contacted the cocatalyst in the reactor.

The term Stress Exponent ("S.E$_x$") is calculated by $$\frac{\log(I_6/I_2)}{\log(3)}.$$

Melt index measurements are carried out at 190° C. as defined under ASTM D1238-94a, wherein $I_2$ refers to an applied weight of 2.16 kg (including plunger) and $I_6$ refers to a proprietary modification of the method using an applied weight of 6.48 kg (including plunger).

On exiting the second reactor, excess polar compound is added to prevent further reaction.

The polymerization conditions and results are set forth in Table 1 below.

TABLE 1

| Sample # | 10775 | 10764 | HD-2007-H |
|---|---|---|---|
| MI | 0.37 | 0.40 | 0.08 |
| I21 | 46.7 | 81.6 | 8.5 |
| MFR (I21/MI) | 125 | 202 | 106 |
| Stress Exponent (S.E$_x$) | 1.60 | 1.97 | |
| Density | 0.9476 | 0.9518 | 0.947 |
| Mn/1000 | 11.8 | 12.5 | |
| Mw/1000 | 116.8 | 114.9 | |
| Mw/Mn | 9.90 | 9.19 | |
| Reactor 1 | | | |
| Ethylene (kg/hr) | 40 | 30 | |
| 1-octene (kg/hr) | 11 | 8 | |
| Hydrogen (g/hr) | 0 | 0 | |
| Temperature (° C.) | 147 | 142 | |
| Total Flow (kg/hr) | 356 | 322 | |
| Ti (micromol/l) | 0.15 | 0.15 | |
| Al/Ti (mol/mol) | 40 | 40 | |
| B/Ti (mol/mol) | 1.1 | 1.1 | |
| Reactor 2 | | | |
| Ethylene (kg/hr) | 65 | 65 | |
| 1-octene (kg/hr) | 0 | 0 | |
| Hydrogen (g/hr) | 12.8 | 13.0 | |
| Temperature (° C.) | 197 | 195 | |
| Total Flow (kg/hr) | 708 | 679 | |
| Ti (micromol/l) | 0.8 | 0.8 | |

TABLE 1-continued

| Sample # | 10775 | 10764 | HD-2007-H |
|---|---|---|---|
| Al/Ti (mol/mol) | 45 | 45 | |
| B/Ti (mol/mol) | 1.2 | 1.2 | |

A sample of the resin produced was subject to TREF analysis at 88–98° C. and 90–98° C. to separate the sample into a high molecular weight portion and a low molecular weight portion. The TREF analysis also enables one to calculate CDBI. The results are set forth below:

| HMWt Component 1 | |
|---|---|
| TREF Elution Temp (° C.) | 90–98 |
| SC Branch Content | 0.0 to 4.4 SCB's per 1000 backbone carbon atoms |
| Density | 0.965 to 0.945 |
| LMWt Component 2 | |
| TREF Elution Temp (° C.) | 88–98 |
| SC Branch Content | 0.5 to 6.1 SCB's per 1000 backbone carbon atoms |
| Density | 0.960 to 0.940 |

A GPC was taken of the samples produced above together with NOVAPOL HD-2007-H. This is shown in FIG. 1. The curves for PS 10764 and PS 10775 were mathematically deconvoluted to determine the Mw, Mn and Mw/Mn for each component. The results are set forth below:

| Results of Deconvolution of the Molecular Weight Distribution | | | |
|---|---|---|---|
| | Property | PS-10775 | PS-10764 |
| Low MW Component | Mn | 10000 | 10500 |
| | Mw | 25000 | 23500 |
| | Pd | 2.5 | 2.25 |
| | Weight fraction, % | 69 | 73 |
| High MW Component | Mn | 208000 | 247000 |
| | Mw | 333000 | 382000 |
| | Pd | 1.6 | 1.55 |
| | Weight fraction, % | 31 | 27 |

Pipe Examples

The resulting polymer together with standard high density polyethylene were extruded into pipe samples. The samples were subject to stress testing as noted in the specification. The results of the testing for the two experimental polymers and a standard HDPE (NOVAPOL HD-2007-H) are set in Table 2 below.

TABLE 2

| | Failure Time (hour) | | |
|---|---|---|---|
| Hoop Stress (psi) | PS-10764 | PS-10775 | HD-2007-H |
| 1000 | 58D | 2D | |
| 975 | 116D | | |
| 950 | 988B | 26D | 40D |
| | | | 47D |
| | | | 76D |
| 925 | 1684B | 169D | 79B |
| | | | 242B |
| | | | 192B |
| 900 | 2004B | 2896B | 115B |
| | | | 375B |

TABLE 2-continued

| | Failure Time (hour) | | |
|---|---|---|---|
| Hoop Stress (psi) | PS-10764 | PS-10775 | HD-2007-H |
| 875 | | 3466B | 298B |
| | | | 265B |
| 850 | 3204B | 5929NF | |
| 825 | | | 1007B |
| | | | 1322B |
| 800 | 3641B | 6218NF | |

Note:
B, D and NF denote brittle or ductile failure modes and not failed specimens, respectively.

The results of the tests show superior resistance to slow crack growth resulting in brittle failure at elevated temperature compared to the standard HDPE. The longer time that corresponds to the ductile-brittle failure transition may be indicative of the increased value of the hydrostatic design basis at high temperature.

INDUSTRIAL APPLICABILITY

The polyolefin pipes produced according to this invention have better durability and are useful for the transport of natural gas and potable water.

What is claimed is:

1. A polyolefin pipe having a hydrostatic design basis at 23° C. of equal or greater than 1250 psi and a ductile-brittle failure transition of at least 2000 hours when measured at 8000 under a minimum hoop stress of 900 psi prepared from a multimodal polyolefin resin comprising not less than 80 weight % of ethylene and up to 20 weight % of one or more $C_{3-10}$ alpha olefins, said composite resin having a density greater than 0.940 g/cm³; a melt index determined according to ASTM D 1238 under a load of 2.16 kg and a temperature of 190° C. greater than 0.01 g/10 minutes, a polydispersity greater than 3.5; and a CDBI of greater than 50 comprising at least:

a) from 5 to 50 weight % of a high molecular weight component having a density greater than 0.940 g/cm³; a weight average molecular weight greater than 250,000; a polydispersity from 1.5 to 3.5: and a short chain branch content from 0.0 to 4.4 short chains per 1000 carbon atoms in the polymer backbone; and b) from 50 to 95 weight % of a lower molecular weight component having a density from 0.930 to 0.960 g/cm³; a weight average molecular weight greater than 25,000; a polydispersity from 2.0 to 3.5; and a short chain branch content from 0.5 to 6.1 short chains per 1000 carbon atoms in the polymer backbone.

2. The polyolefin pipe according to claim 1 wherein said multimodal polyolefin resin has a melt index determined according to ASTM D 1238 under a load of 2.16 kg and temperature of 190° C. from 0.10 to 0.50 g/10 minutes.

3. The polyolefin pipe according to claim 2 wherein said multimodal polyolefin resin has a polydispersity greater than 5.

4. The polyolefin pipe according to claim 3 wherein said multimodal polyolefin resin is a bimodal polyolefin resin.

5. The polyolefin pipe according to claim 4 wherein the high molecular weigh component of the bimodal polyolefin resin is present in an amount from 15 to 40 weight % based on the total weight of the resin.

6. The polyolefin pipe according to claim 5 wherein the low molecular weight component of the bimodal polyolefin resin is present in an amount from 85 to 60 weight % based on the total weight of the resin.

7. The polyolefin pipe according to claim 6 wherein said bimodal polyolefin resin has a CDBI from 70 to 95.

8. The polyolefin pipe according to claim 7 wherein said bimodal polyolefin resin has a density from 0.940 to 0.955 g/cm$^3$.

9. The polyolefin pipe according to claim 8 wherein said bimodal polyolefin resin has a melt index determined according to ASTM D 1238 under a load of 2.16 kg and a temperature of 190° C. from 0.10 to 0.50 g per 10 minutes.

10. The polyolefin pipe according to claim 9 wherein said bimodal polyolefin resin has a polydispersity greater than 5.

11. The polyolefin pipe according to claim 10 wherein said bimodal polyolefin resin has a CDBI from 75 to 80.

12. The polyolefin pipe according to claim 11 wherein said bimodal polyolefin resin has a density from 0.945 to 0.950 g/cm$^3$.

13. The polyolefin pipe according to claim 12 wherein said bimodal polyolefin resin has a melt index determined according to ASTM D 1238 under a load of 2.16 kg and a temperature of 190° C. from 0.10 to 0.40 g/10 minutes.

14. The polyolefin pipe wherein said bimodal polyolefin resin has a polydispersity greater than 5.

* * * * *